(12) United States Patent
Elwart et al.

(10) Patent No.: US 9,824,300 B2
(45) Date of Patent: Nov. 21, 2017

(54) VEHICLE LANE LEARNING

(71) Applicant: Ford Global Technologies, LLC, Dearborn, MI (US)

(72) Inventors: Shane Elwart, Ypsilanti, MI (US); Raveen Fernando, State College, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 15/057,436

(22) Filed: Mar. 1, 2016

(65) Prior Publication Data
US 2017/0255843 A1    Sep. 7, 2017

(51) Int. Cl.
*G06K 9/62* (2006.01)
*G06K 9/00* (2006.01)
(Continued)

(52) U.S. Cl.
CPC .......... *G06K 9/6267* (2013.01); *B60W 10/18* (2013.01); *B60W 10/20* (2013.01); *B60W 30/12* (2013.01); *G01C 21/12* (2013.01); *G01C 21/16* (2013.01); *G01C 21/20* (2013.01); *G01S 19/01* (2013.01); *G06K 9/00798* (2013.01); *G06K 9/4604* (2013.01); *G06T 7/0044* (2013.01); *B60W 2420/42* (2013.01); *B60W 2550/14* (2013.01); *B60W 2710/18* (2013.01); *B60W 2710/20* (2013.01); *B60W 2720/106* (2013.01); *G06T 2207/10016* (2013.01); *G06T 2207/30256* (2013.01)

(58) Field of Classification Search
USPC ........................................................ 382/104
See application file for complete search history.

(56) References Cited

U.S. PATENT DOCUMENTS 7,327,234 B2 *  2/2008  Egami ................. B60N 2/0224
                                                        340/407.1
7,499,801 B2    3/2009  Sakashita et al.
                                (Continued)

FOREIGN PATENT DOCUMENTS

DE    2007018990 A1    12/2007
DE    2004060432 B4    4/2008

OTHER PUBLICATIONS

UKIPO Search Report for Application No. GB1703175.8 dated Jul. 21, 2017 (3 pages).

*Primary Examiner* — Ishrat I Sherali
(74) *Attorney, Agent, or Firm* — Frank A. MacKenzie; Bejin Bieneman PLC

(57) ABSTRACT

A system of one or more computers can be configured to perform particular operations or actions by virtue of having software, firmware, hardware, or a combination of them installed on the system that in operation causes or cause the system to perform the actions. One general aspect includes a system, including a computer having a processor and a memory, the memory storing instructions executable by the processor such that the computer is programmed to receive an image of at least one lane marker from an image capture device mounted to a vehicle. The system also identifies a lane transition according to the image. The system can also control at least one of steering, braking, and acceleration of the vehicle according to a history of data concerning the lane transition locations.

20 Claims, 6 Drawing Sheets

(51) Int. Cl.
  *B60W 30/12*   (2006.01)
  *B60W 10/18*   (2012.01)
  *B60W 10/20*   (2006.01)
  *G01C 21/16*   (2006.01)
  *G01C 21/12*   (2006.01)
  *G01S 19/01*   (2010.01)
  *G01C 21/20*   (2006.01)
  *G06T 7/00*    (2017.01)
  *G06K 9/46*    (2006.01)

(56) References Cited

U.S. PATENT DOCUMENTS

| | | | |
|---|---|---|---|
| 8,306,270 B2 * | 11/2012 | Sato | G06T 7/13 |
| | | | 382/104 |
| 8,605,947 B2 * | 12/2013 | Zhang | G06K 9/00798 |
| | | | 348/116 |
| 8,688,373 B2 | 4/2014 | Noro et al. | |
| 8,886,364 B2 | 11/2014 | Takahara et al. | |
| 9,047,518 B2 | 6/2015 | Nunn et al. | |
| 9,317,756 B2 * | 4/2016 | Takemae | |
| 9,401,028 B2 * | 7/2016 | Kuehnle | G06K 9/00798 |
| 9,494,438 B1 * | 11/2016 | Ichinokawa | |
| 2009/0132139 A1 | 5/2009 | Takeuchi et al. | |
| 2010/0054538 A1 * | 3/2010 | Boon | G06K 9/00798 |
| | | | 382/104 |
| 2016/0176341 A1 | 6/2016 | Raghu et al. | |

\* cited by examiner

| Location | Times Exited | Total number Trips | Earliest Date |
|---|---|---|---|
| I-85 & Main Street | 26 | 50 | 2-1-16 |
| I-85 & Central Avenue | 5 | 50 | 2-12-15 |
| I-85 & I-94 | 6 | 50 | 8-14-15 |
| I-85 & U.S. 1 | 4 | 50 | 1-1-16 |
| I-85 & Amtrak | 1 | 50 | 7-4-15 |
| I-85 & I-95 | 6 | 50 | 8-16-15 |
| I-85 & I-685 | 2 | 50 | 11-27-15 |

FIG. 3

VEHICLE LANE LEARNING

BACKGROUND

Tracking lane markings is important for various kinds of driver assistance systems in modern motor vehicles. For example, a lane departure warning (LDW) can use the tracking of lane markings to determine the position of the vehicle within the lane and can emit a warning signal if the vehicle gets too close to, or crosses, a lane boundary. However, mechanisms are lacking for vehicles to identify lane markings.

BRIEF DESCRIPTION OF THE DRAWINGS

FIG. 3 is an exemplary transition chart which can predict the vehicle response at certain locations.

DETAILED DESCRIPTION

Learning the Road

Figure 1:
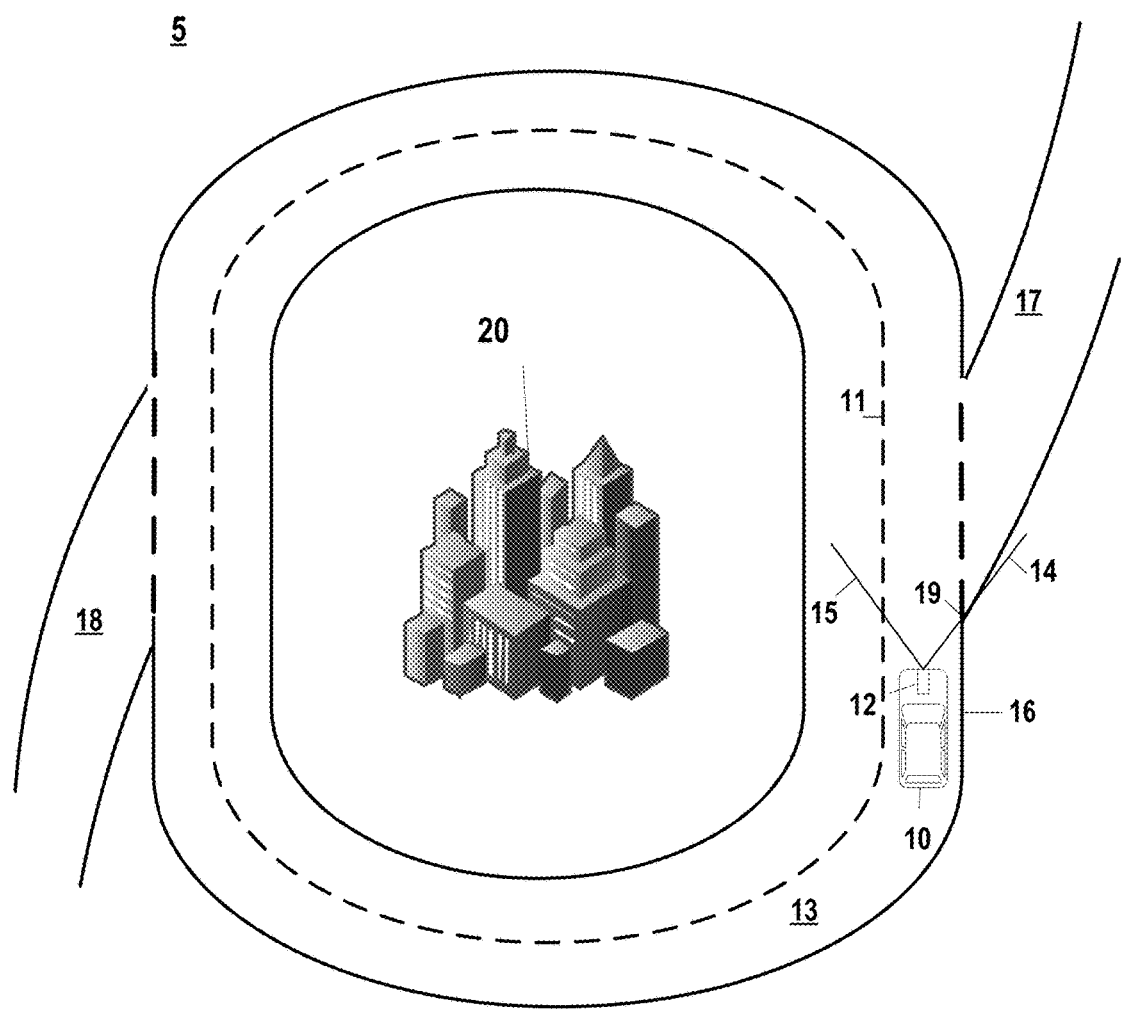
FIG. 1 is a block diagram of an exemplary vehicle on a highway roadway detecting a left and a right roadway marking.

Referring to FIG. 1, illustrated is an exemplary vehicle lane marker detection system 5 for a vehicle 10 on a highway lane 13, which for purposes of this example is a highway such as a beltway around a city 20. The vehicle 10 lane has a left lane marker 11, which is a single broken line (e.g., a conventional painted lane marking on a roadway) to the left of the vehicle 10 and a single unbroken line at the right lane marker 16, which changes to a second single broken line 19 at an exit ramp 17. The vehicle 10 has one or more image capture devices, such as forward facing camera 12 with a left view site line 15 and a right view site line 14.

Figure 2:
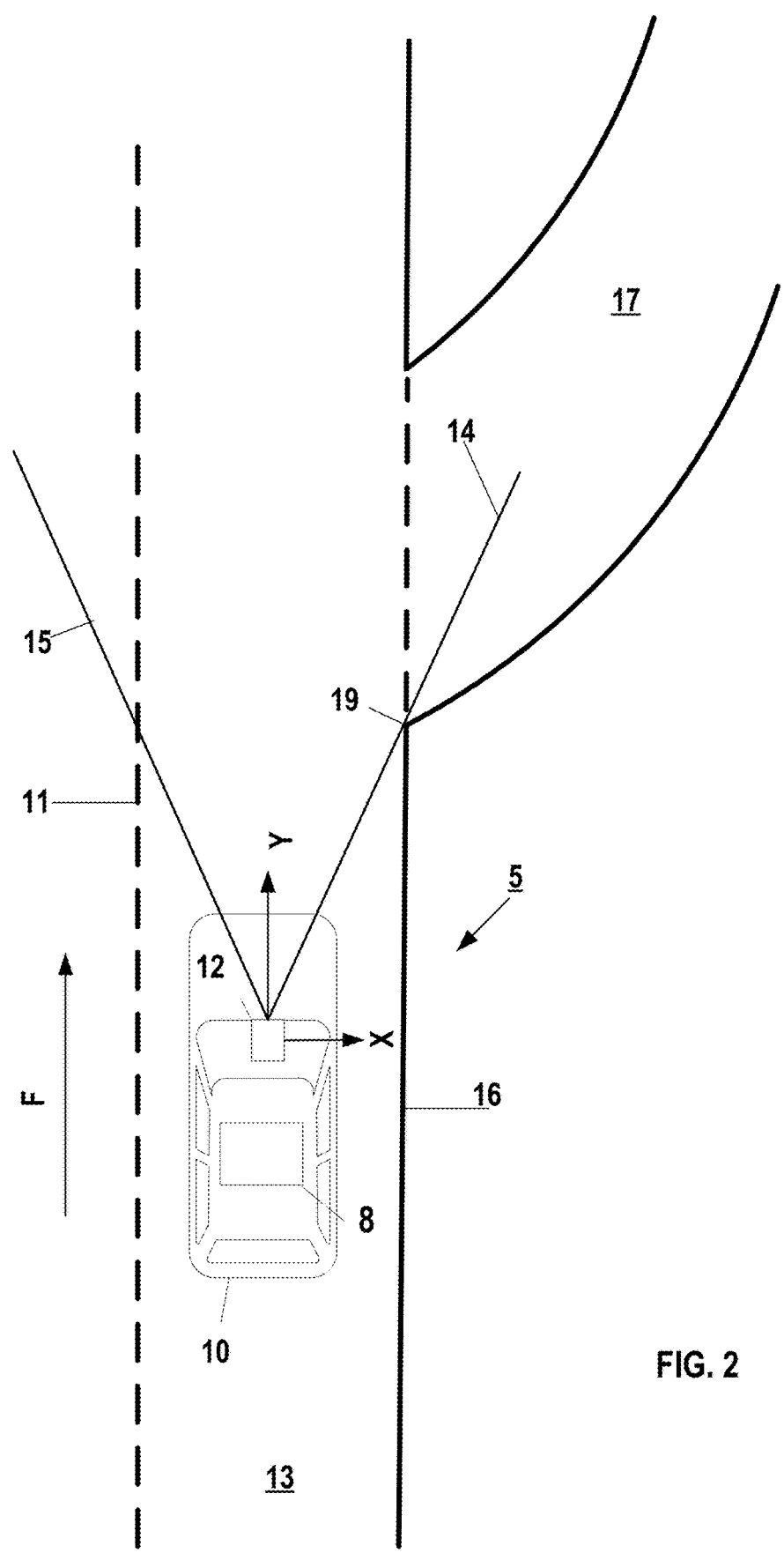
FIG. 2 is a detailed block diagram illustrating a portion of the highway roadway of FIG. 1 including an exemplary vehicle detecting a change in the left lane marking indicating a highway exit ramp.

Now with reference to FIG. 2, which is a detail blocked diagram of the system 5 of FIG. 1 which better illustrates the left lane marker 11 to the left of the vehicle 10 and the single unbroken line right lane marker 16 to the right, which changes to the second single broken line 19 at the beginning of the exit ramp 17. Also shown is a computer 8, which can also be referred to as an imaging electronic control unit (ECU). The computer 8 has at least one processor and memory to store computer instructions, register values, and temporary and permanent variables. The instructions include one or more predetermined detection criteria for a lane marker.

The computer 8 may also include an additional special processor, such as an image processor or a digital signal processor (DSP) to aid the processor with signal interpretation. The computer 8 is communicatively coupled to the camera 12, e.g., via a vehicle communications bus or other vehicle network such as is known.

As the vehicle 10 traverses around the highway lane 13, the camera 12 can substantially continuously capture images of the highway lane 13 ahead. The computer 8 substantially continuously receives images of the highway and the right and left lane markers. The computer 8 includes program instructions to determine the occurrence of a detected transition identifier, for example, when the right lane marker 16 is a solid white line having a width of 50 cm and the left lane marker is a dashed line having a width of 50 cm. Several data entries can be recorded into memory when the right lane marker 16 changes to a dashed line with a width of 50 cm, even if there was not a change in the left lane marker 11. The entries can include, for example, a geolocation of the transition, a lane marker type of change, a change of direction of the vehicle 10, etc.

FIG. 3 is an example of a transition chart 25 which can be assembled from historical data as the vehicle 10 traverses the highway lane 13. A "transition," as that term is used herein, encompasses an event in which a vehicle 10 changes lanes. For example, when the vehicle 10 approaches a first exit ramp 17, as indicated in row 27 in the chart 25 as the intersection of I-85 and Main Street, the vehicle 10 exited the highway lane 13 twenty-six times of the last fifty times the vehicle 10 identified the exit ramp 17. However, when the vehicle 10 approached second exit ramp 18, identified in row 21, which is at the intersection of I-85 and Central Avenue, the vehicle 10 exited the highway lane 13 five times of the last fifty times. Therefore, at each transition position, i.e., an instance in which the vehicle 10 traverses a portion of a highway that can be a subject of the chart 25, i.e., a place where the vehicle 10 could be exiting, changing lanes and/or turning, and is identified by, for example, a change in the lane markings, can be represented by the values of the cells in the transition chart 25. These values are incremented each time the vehicle 10 traverses a transition position. A "location column" 22 of the chart 25 identifies the location of the transition position and a "times exited" column 23 has a number of times the vehicle 10 exited, changed lanes or took some other identifiable action. A "total number of trips" column 24 has a running total of the number of trips the vehicle has taken on a particular route and an "earliest date" column 26 keeps track of an earliest date the vehicle 10 has come across the transition position indicated in the column 22. The earliest date 26 can be used to keep the chart 25 current, for example, any trips recorded that are more than a year old can be removed from the "times exited" column 23 and the "total number trips" column 24.

Figure 4:
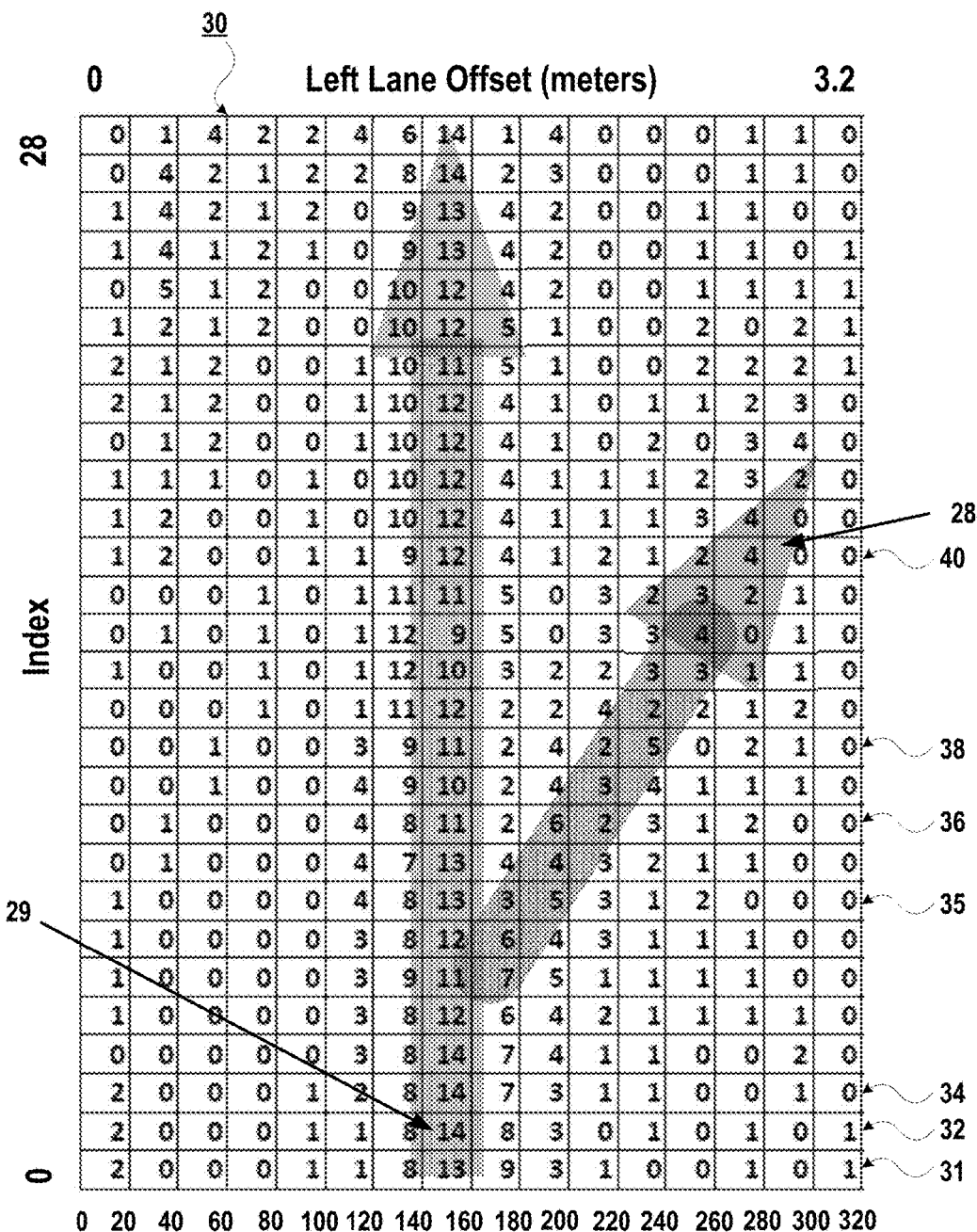
FIG. 4 is an exemplary resultant action matrix which may represent one of the cells of the exemplary transition chart of FIG. 3.

FIG. 4 is an example resultant action matrix 30 which can include an entry for each lane transition. A resultant action matrix 30 maps data represented in the aggregate in a transition chart 25, e.g., the times exited column 23 from the chart 25 shown for the transition location of the row 27 is shown in detail in the matrix 30 of FIG. 4. More specifically, the action matrix 30 represents one of the cells of the exemplary transition chart 25 of FIG. 3 of vehicle 10 positions relative to the left lane marker 11 for twenty-eight distance increments (indexes 1 to 28 along the vertical axis) as the vehicle 10 approaches the exit ramp 17. An index 0 is a location on the highway lane 13 designated as a reference location for a transition location; the indexes may then represent predetermined distance increments, e.g., 1 meter, 3 meters, 5 meters, etc., along the highway lane 13 with reference to the 0 index location. (For example, with 28 rows in the index of the matrix 30, a transition from one row to the next row represents approximately 3.5 meters.) Values in each cell in the matrix 30 thus represent a number of times that a vehicle 10 had been at the lateral offset indicated by the left lane offset shown on the vertical axis for each time that the vehicle 10 has passed the transition location's 0 index, the 0 position for the lateral offset being a leftmost border of a leftmost lane of the highway lane 13. Thus, the matrix 30 provides a history of vehicle 10 passages through the approach to the exit ramp 17, e.g., forty different trips in this example.

As stated above, each time a transition occurs, the appropriate cells of the resultant action matrix 30 are updated, for example, when the vehicle travels through the transition area, the cells representing the lateral and longitudinal positon at each of the longitudinal indexes 0 to 28 will be incremented by one.

The datum in each row and column of the matrix 30 therefore provides a number of times that a response to a lane marking was recorded at a particular lateral position in the lane (i.e., at a particular distance from the left lane marker) at a particular distance index. Thus, over time the resultant action matrix 30 will provide a history of travel either through the transition location, where higher numbers represent a higher probability of the vehicle 10 tendency to follow the matrix learned path. For example, with reference to row 31 (at index 0), the value "2" is provided at the intersection of the lateral position 0 and longitudinal index of 0, reading from left to right, where each adjacent box represents a segment of the width of the lane of approximately equal to 20 cm (centimeters), which can total the width of the highway lane 13, which in this example is approximately 3.2 meters. That is, the vehicle 10 determined that it was at the extreme left of the highway lane 13 two times of the last forty passages through this location on the highway lane 13. The vehicle was 100 cm from the left lane marker 11 one time of the forty passages. The vehicle was 120 cm from the left lane marker 11, one time. The vehicle was 140 cm from the left lane marker 11 eight times and the vehicle 10 was 160 cm from the left lane marker 11 thirteen times. Continuing, the vehicle 10 was 180 cm away nine times, 200 cm away three times, 220 cm away one time, 280 cm away one time and 300 cm away from the left lane marker 11 one time.

In the next row, row 32, with a longitudinal index of one, it can be seen that the vehicle 10 was 160 cm away from the left lane marker 11 fourteen times, 180-220 cm away from the left lane marker 11 eight times and 240-320 cm away three times. In the next row, row 34 (longitudinal index 2), it can be seen that the vehicle was 160 cm away from the left lane marker 11 fourteen times, 180-220 cm away from the left lane marker 11 eleven times and 240-320 cm away two times. At a row 35 (longitudinal index of 7), the vehicle 10 was 160 cm away from the left lane marker 11 thirteen times, 180-220 cm away from the left lane marker 11 eleven times and 240-320 cm away three times. At a row 36 (longitudinal index of 9), the vehicle 10 was 160 cm away from the left lane marker 11 eleven times, 180-220 cm away from the left lane marker 11 ten times and 240-320 cm away six times. At a row 38 (longitudinal index of 11), the vehicle 10 was 160 cm away from the left lane marker 11 eleven times, 180-220 cm away from the left lane marker 11 eight times and 240-320 cm away eight times. At a row 40 (longitudinal index of 16), the vehicle 10 was 160 cm away from the left lane marker 11 twelve times, 180-220 cm away from the left lane marker 11 seven times and 240-320 cm away seven times. FIG. 4 shows that the vehicle 10 tended to stay in the middle of the highway lane 13, however, the number of times the vehicle 10 exited the highway lane 13 is apparent by noting the number of times the vehicle 10 had entries in the 140-300 cm columns. An arrow 29 is superimposed upon the center columns of FIG. 4 to represent the tendency for the vehicle 10 to stay in the middle of the highway lane 13. A second arrow 28 is representative of the occasional tendency when the vehicle 10 leaves the highway lane 13 and exits via the exit ramp 17.

When the computer 8 is detecting lane markers and lane maker transitions, the computer 8 can classify the lane markings into an invalid lane category and a valid lane category. The valid lane category can include, for example, a single unbroken line, a double unbroken line, a single broken line, a double broken line, a broken and unbroken line, a wide broken line, a line with surface profile and a single unbroken with single broken line. The invalid lane marker can be, for example, a guide rail or a land mark.

The vehicle 10 position can be obtained via several methods including a global navigation satellite system (GNSS) or a Global Positioning System (GPS) receiver, a dead reckoning system, an inertial navigation system and can be calculated using the number of tire rotations to determine the distance from a known start reference point.

The GNSS is a system of satellites that provide autonomous geo-spatial positioning with global coverage. It allows small electronic receivers to determine their location (longitude, latitude, and altitude/elevation) to high precision (within a few meters) using time signals transmitted along a line of sight by radio from satellites. The signals also allow the electronic receivers to calculate the current local time to high precision, which allows time synchronization. GPS is United States of America term for a space-based navigation system that provides location and time information in all weather conditions, anywhere on or near the Earth where there is an unobstructed line of sight to four or more GPS satellites.

Dead reckoning is the process of calculating one's current position by using a previously determined position, or "fix", and advancing that position based upon known or estimated speeds over elapsed time and course. The vehicle 10 would obtain a "fix" and calculate the direction and distance traveled for a certain time and determine the vehicle 10 new location. The internal navigation system is course plotting aid that uses a computer, motion sensors (accelerometers) and rotation sensors (gyroscopes) to continuously calculate via dead reckoning the position, orientation, and velocity (direction and speed of movement) of a moving object without the need for external references.

The geolocation of the vehicle 10 can be in Universal Transverse Mercator (UTM), coordinate system, a vehicle coordinate system as defined by the International Organization for Standardization (ISO) for a vehicle coordinate system, a military grid reference system (MGRS) and a universal polar stereographic (UPS) system. The UTM system divides the Earth between 80° S and 84° N latitude into 60 zones, each 6° of longitude in width. Zone 1 covers longitude 180° to 174° W; zone numbering increases eastward to zone 60, which covers longitude 174° to 180° E. Each of the 60 zones uses a transverse Mercator projection that can map a region of large north-south extent with low distortion. By using narrow zones of 6° of longitude (up to 800 km) in width, and reducing the scale factor along the central meridian to 0.9996 (a reduction of 1:2500), the amount of distortion is held below 1 part in 1,000 inside each zone.

The MGRS is the geocoordinate standard used by NATO militaries for locating points on the earth. The MGRS is derived from the Universal Transverse Mercator (UTM) grid system and the universal polar stereographic (UPS) grid system, but uses a different labeling convention. The MGRS is used for the entire earth.

The UPS coordinate system is used in conjunction with the universal transverse Mercator (UTM) coordinate system to locate positions on the surface of the earth. Like the UTM coordinate system, the UPS coordinate system uses a metric-based Cartesian grid laid out on a conformally projected surface.

In addition, the path may be filtered into the driving path using known Kalman or other filtering techniques. Providing a Kalman filter, for example, can compensate for noisy readings which can 'jump around' rapidly, though always remaining within a few meters of the real position. In addition, since the vehicle 10 is expected to follow the laws of physics, its position can also be estimated by integrating its velocity over time, determined by keeping track of wheel revolutions and the angle of the steering wheel. As discussed above, this is a technique known as dead reckoning. Typically, the dead reckoning will provide a very smooth estimate of the vehicle 10 position, but it will drift over time as small errors accumulate.

The Kalman filter can be thought of as operating in two distinct phases: predict and update. In the prediction phase, the vehicle 10 position will be modified according to the physical laws of motion (the dynamic or "state transition" model) plus any changes produced by the accelerator pedal and steering wheel. A new position estimate can be calculated and inserted into the transition chart as well as an update to the resultant action matrix.

In operation, the vehicle lane marker detection system 5 may erroneously determine that the vehicle 10 is in traveling through a center median. Since it is physically impossible to travel through a solid, the erroneous positional determination will be treated as noise and the Kalman filter can eliminate and/or suppress such spurious calculated vehicle 10 positions. The Kalman filter can use coefficients based upon the vehicle 10 travel history, for example, previous trips on the highway lane 13.

A dead reckoning positional error of the vehicle 10 position is in part, proportional to the speed of the vehicle 10. This is due to the uncertainty about the accuracy of the dead reckoning position estimates at higher speeds, as a small amount of positional errors grow rapidly at higher speeds than at slower speeds. Therefore, once the vehicle 10 detects a "known position", such as a lane marker, the system can correct for any dead reckoning drift form the actual position. Other "known positions," for example, can be a lane marker transition, a lane marker at a known intersection, a road sign, a land marks, etc.

Process Flows

Figure 5:
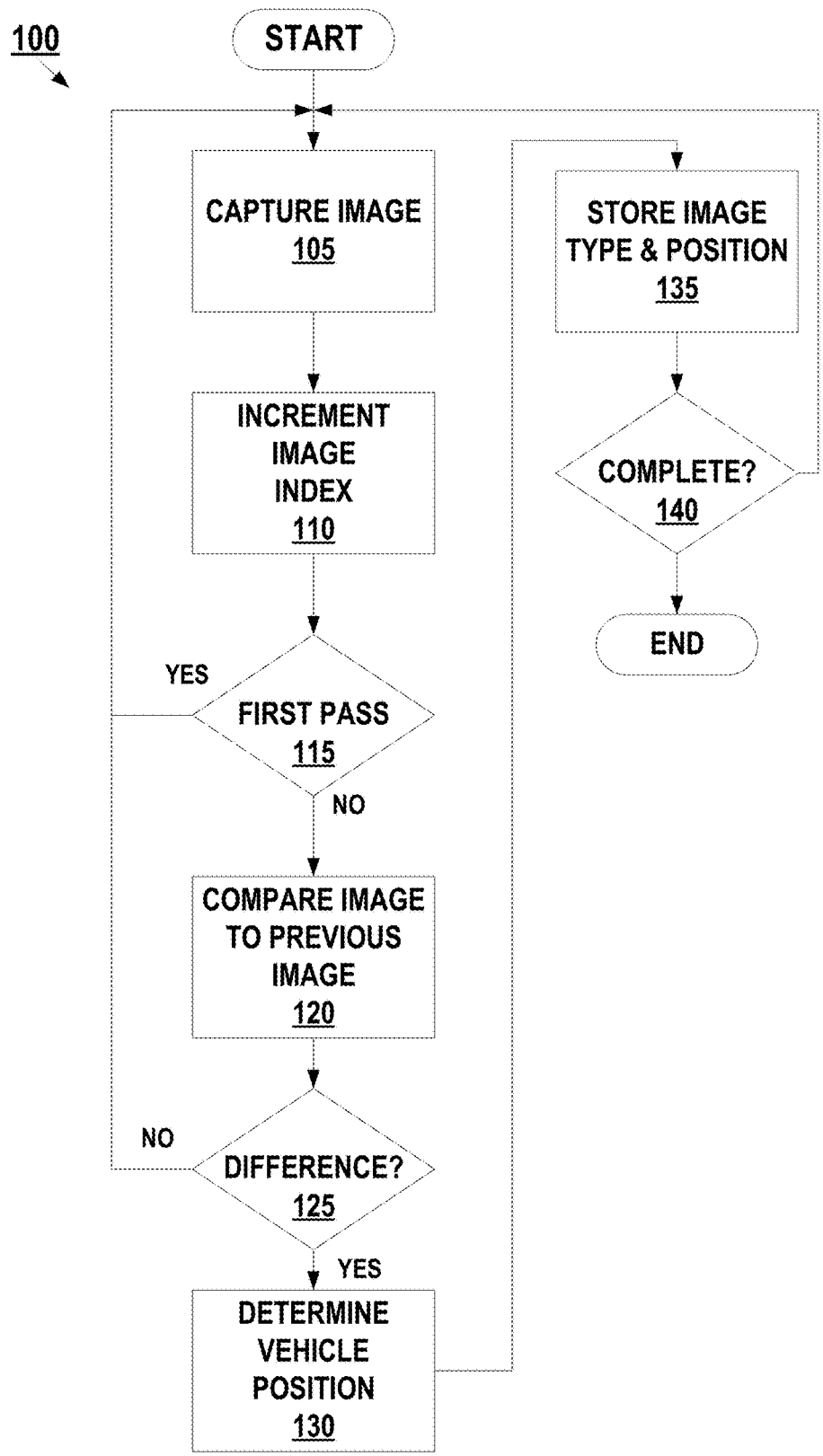
FIG. 5 is a flowchart of an exemplary process that may be implemented by the vehicle's computer.

FIG. 5 is a flow chart illustrating an exemplary process 100 of the computer 8 to capture an image of lane markings, determine the vehicle's relative position in the lane and the vehicle's geolocation and save the values in a transition matrix.

The process 100 begins in a block 105, which can also follow in a block 115 or in a block 125. The camera 12 captures a forward facing image (relative to the vehicle 10) of the highway lane 13. The image is stored in memory on the computer 8, which can also be known as an imagining electronic control unit (ECU), and the right and left lane marker types are identified, e.g., using image recognition techniques such as are known and that can be included in program instructions in the computer 8. As discussed above, the lane marker types can include a single unbroken line, a double unbroken line, a single broken line, a double broken line, a broken and unbroken line, a wide broken line, a line with surface profile and a single unbroken with single broken line. The computer 8 can also usually differentiate an invalid image object from a lane marking, for example, the computer 8 can determine that the lane marker is not a lane marker, but rather a guard rail.

In a block 110, a counter is incremented to a next position dicating an image and its characteristics have been loaded into memory. The characteristics can include the right and left lane marker types and the geolocation of the vehicle 10.

Next, in the block 115, the computer 8 determines if the image stored in a most recent iteration of the block 105 is a first image captured, and if it is the first image captured, the system will return to in the block 105 and capture a next sequential image, else the system 100 will continue in a block 120.

Next, in a block 120, the current image characteristics are compared to the previous image's characteristics, for example, the computer 8 determines that the current right lane marker has changed from a single unbroken to a single broken line. If there is a difference in image characteristics, the process 100 continues in a block 125, else the process returns to the block 105.

Next, in a block 130, the system 100 determines a lane offset distance of the vehicle 10 with respect to the lane the vehicle 10 is in, for example, if the vehicle 10 is in the center of the highway lane 13 and the lane is three meters wide, the left lane marker offset can be 150 cm to the center of the vehicle 10. Additionally, the vehicle 10 geolocation can be determined from the methods cited above, including a global navigation satellite system (GNSS) or a Global Positioning System (GPS) receiver, a dead reckoning system, an inertial navigation system and can be calculated using the number of tire rotations to determine the distance from a known start reference point.

Next, a block 135, the computer stores the left lane marker offset, the left lane marker type, the right lane marker type and a geolocation of the vehicle 10 into a memory.

Next, in a block 140, the computer 8 determines if the segment of the trip requiring collecting images and lane marking data is complete, and if it is the process 100 ends, else the process 100 returns to the block 105.

Figure 6:
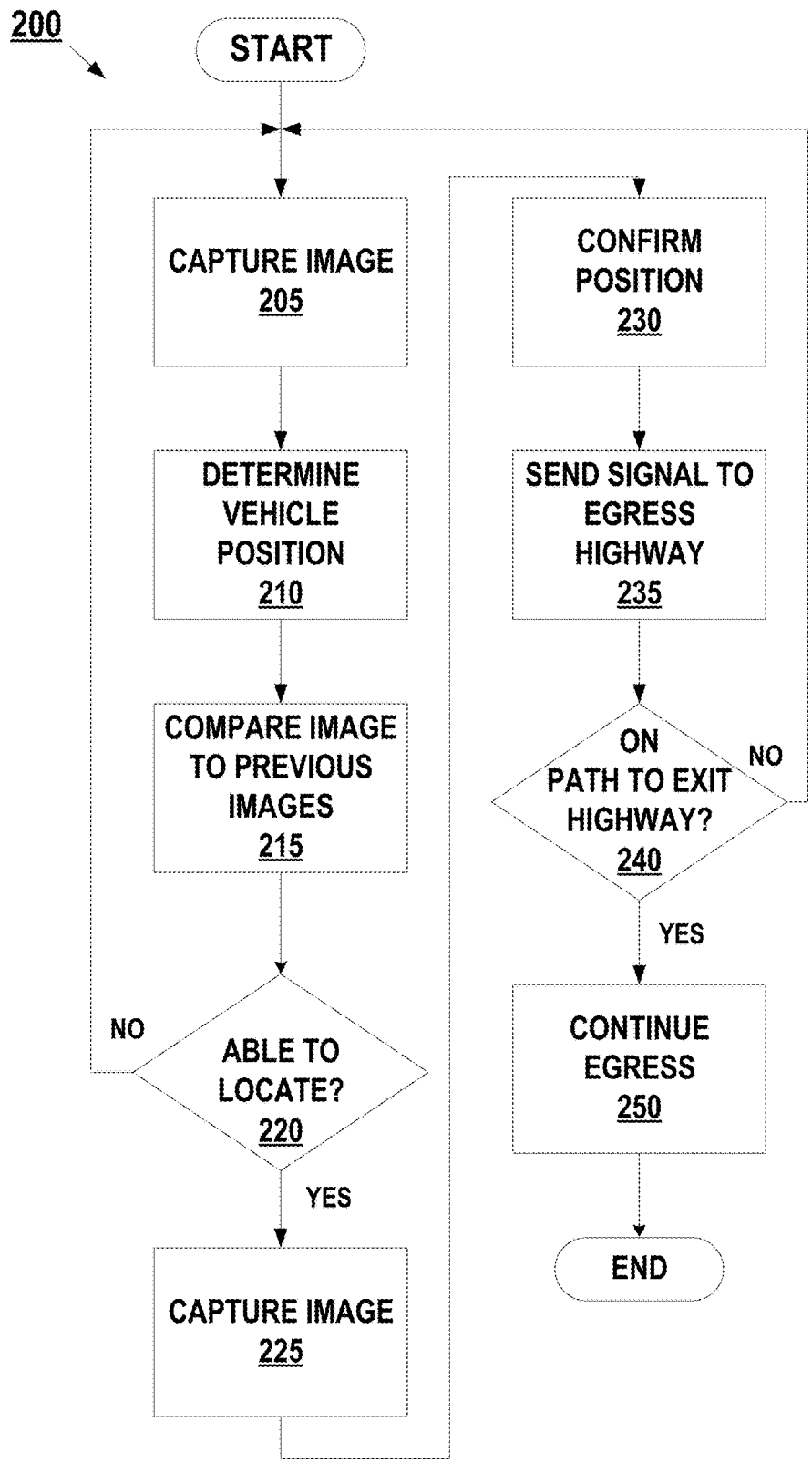
FIG. 6 is a flowchart of a second exemplary process that may be implemented by the vehicle's computer.

FIG. 6 is a flow chart illustrating an exemplary process 200 of the computer 8 for determining the location of the vehicle 10 and an exit ramp.

The process 200 begins in a block 205, which can also follow in a block 220 or in a block 240. The camera 12 captures a forward facing image (relative to the vehicle 10) of the highway lane 13. The image is stored in memory on the computer 8.

Next in a block 210, the computer 8 determines the position of the vehicle 10. The position can be generally determined using GNSS or dead reckoning from a known start point Next, in a block 215, the processor compares the captured image characteristics with known geolocations and their characteristics. For example, when the right lane marker 16 changes from the single unbroken line to the second single broken line 19 at the exit ramp 17. The computer 8 can then determine the vehicle 10 position on the highway lane 13.

Next, in the block 220, the computer 8 makes a determination in any of the recently captured image's characteristics matches any characteristics of previously stored images in the transition matrix. If there is a match, the process continues to in a block 225, else the process returns to in the block 205 to capture and process another image from the camera 12.

Next, in the block 225, the process 200 can optionally capture another image from the camera 12 and its lane marking characteristics are extracted.

Next in a block 230, the optional image lane characteristics from in the block 225 are checked against the database to verify the positioning of the vehicle 10.

Next, profile in a block 235, the computer 8 sends a control signal to the vehicle 10 to commence the egress of the highway lane 13 onto the exit ramp 17. If the vehicle 10 is an autonomous vehicle, the vehicle's onboard control and navigation system will maneuver the vehicle by controlling one or more of steering, braking, and acceleration. If the vehicle is a non-autonomous vehicle, the computer 8 will send an alert to the vehicle 10 and the operator that the vehicle 10 is approaching a desired exit.

In other words, if the exit and the highway path have been traveled repeatedly, then there will be a statistical preference of which path is a preferred path and its preferred shape of travel relative to the resultant action matrix 30, starting at the transition point of the particular transition matrix cell. When a detection of a particular transition is detected then driver can be alerted of the preferred learned decision and take action unless canceled by the driver or passenger.

Next in a block 240, the computer 8 verifies that the vehicle 10 is on the exit ramp. This can be accomplished with another image capture of the lane markings or by taking a GNSS position. If the vehicle is on the exit ramp 17, the process continues to in a block 250, else the process returns to in the block 205.

Next, in a block 250, the computer 8 sends a message to the vehicle's onboard control and navigation system confirm the egress or a message to the operator. Following the block 250, the process 200 ends.

CONCLUSION

As used herein, the adverb "substantially" modifying an adjective means that a shape, structure, measurement, value, calculation, etc. may deviate from an exact described geometry, distance, measurement, value, calculation, etc., because of imperfections in the materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Python, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer having a processor and a memory, the memory storing instructions executable by the processor such that the computer is programmed to:
   receive an image of at least one lane marker from an image capture device mounted to a vehicle;
   identify a lane transition location according to the image; and
   control at least one of steering, braking, and acceleration of the vehicle according to a history of data concerning the lane transition location.

2. The system of claim 1, wherein the computer is further programmed to determine an offset distance from a lane marker to the vehicle.

3. The system of claim 2, wherein the computer is further programmed to:
   determine a geolocation of the vehicle; and
   store in the memory at least a lane marker type, a pattern of the lane marking, the offset distance and the geolocation of the vehicle.

4. The system of claim 1, wherein the computer is further instructed to assign a lane marker to a lane marking category.

5. The system of claim 4, wherein the lane marking category includes at least a valid lane marker or an invalid lane marker.

6. The system of claim 5, wherein the computer further determines the invalid lane marker when the lane marker type is an invalid image object.

7. The system of claim 1 wherein the lane marker includes at least a single unbroken line, a double unbroken line, a single broken line, a double broken line, a broken and unbroken line, a wide broken line, and a single unbroken with single broken.

8. The system of claim 2, wherein the computer further determines a change in the lane marker and store in the memory at least the lane marker type, the pattern of the lane marking, the offset distance and the geolocation of the vehicle.

9. The system of claim 8, wherein the computer is further instructed to obtain the geolocation from at least a Global Positioning System (GPS) receiver, a dead reckoning system; and an inertial navigation system.

10. The system of claim 3, wherein the geolocation is at least a Universal Transverse Mercator (UTM) coordinate system, a military grid reference system (MGRS) and a universal polar stereographic (UPS) system.

11. A method, comprising:
receiving an image of at least one lane marker from an image capture device mounted to a vehicle;
confirming that the image meets a predetermined detection criterion as a detected lane marking;
determining a lane marker type;
determining if a pattern of the lane marking has changed from a previous image;
comparing the pattern of the lane marker to a set of geolocations and their associated characteristics that are stored in a memory; and
controlling at least steering, braking, acceleration of the vehicle as the vehicle egresses a highway.

12. The method of claim 11, further comprising determining an offset distance from the lane marker to the vehicle.

13. The method of claim 12, further comprising:
determining a geolocation of the vehicle; and
storing in a memory at least the lane marker type, the pattern of the lane marking, an offset distance and the geolocation of the vehicle.

14. The method of claim 11, further comprising assigning the lane marker to a lane marking category.

15. The method of claim 14, wherein the lane marking category includes at least a valid lane marker or an invalid lane marker.

16. The method of claim 15, further comprising determining the invalid lane marker from an invalid image object.

17. The method of claim 13 wherein the lane marker includes at least a single unbroken line, a double unbroken line, a single broken line, a double broken line, a broken and unbroken line, a wide broken line, and a single unbroken with single broken.

18. The method of claim 12, further comprising:
determining a change in the lane marker; and
storing in memory at least at least the lane marker type, the pattern of the lane marking, the offset distance and the geolocation of the vehicle.

19. The method of claim 18, further comprising determining to obtain the geolocation from at least a Global Positioning System (GPS) receiver, a dead reckoning system; and an inertial navigation system.

20. The method of claim 13, wherein the geolocation is at least a Universal Transverse Mercator (UTM) coordinate system, a military grid reference system (MGRS) and a universal polar stereographic (UPS) system.

\* \* \* \* \*

UNITED STATES PATENT AND TRADEMARK OFFICE
CERTIFICATE OF CORRECTION

PATENT NO. : 9,824,300 B2  
APPLICATION NO. : 15/057436  
DATED : November 21, 2017  
INVENTOR(S) : Shane Elwart and Raveen Fernando Page 1 of 1

It is certified that error appears in the above-identified patent and that said Letters Patent is hereby corrected as shown below:

In the Claims

Column 10, in Line 20, replace "memory at least at least the" with -- memory at least the --.

Signed and Sealed this  
Third Day of July, 2018

Andrei Iancu  
*Director of the United States Patent and Trademark Office*